(12) United States Patent
Michael et al.

(10) Patent No.: US 8,990,367 B2
(45) Date of Patent: Mar. 24, 2015

(54) CONSISTENT BINDING OF SHARED STORAGE ACROSS CLUSTERED SERVERS

(75) Inventors: Tesfamariam Michael, Raleigh, NC (US); Mahmoud B. Ahmadian, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 686 days.

(21) Appl. No.: 11/537,393

(22) Filed: Sep. 29, 2006

(65) Prior Publication Data
US 2008/0082623 A1 Apr. 3, 2008

(51) Int. Cl.
G06F 15/173 (2006.01)
G06F 7/00 (2006.01)
G06F 17/30 (2006.01)
G06F 15/16 (2006.01)

(52) U.S. Cl.
CPC ............ *G06F 7/00* (2013.01); *G06F 17/30315* (2013.01)
USPC .......................................... 709/223; 709/208

(58) Field of Classification Search
USPC .................................. 709/213, 214, 215, 223
See application file for complete search history.

(56) References Cited

U.S. PATENT DOCUMENTS

| | | | |
|---|---|---|---|
| 5,052,040 A | 9/1991 | Preston et al. ..................... 380/4 |
| 6,260,120 B1 | 7/2001 | Blumenau et al. ............ 711/152 |
| 6,594,698 B1 | 7/2003 | Chow et al. .................... 709/226 |
| 6,671,776 B1 | 12/2003 | DeKoning .................... 711/114 |
| 7,039,687 B1 * | 5/2006 | Jamieson et al. ............. 709/220 |
| 7,130,621 B2 | 10/2006 | Blawat et al. .................. 455/418 |
| 7,293,152 B1 * | 11/2007 | Srinivasan et al. ............ 711/202 |
| 7,389,396 B1 * | 6/2008 | Goel et al. ..................... 711/167 |
| 7,990,994 B1 * | 8/2011 | Yeh et al. ....................... 370/431 |
| 2003/0225935 A1 * | 12/2003 | Rivard et al. .................. 709/328 |
| 2006/0095447 A1 * | 5/2006 | Dickinson et al. ............ 707/100 |

OTHER PUBLICATIONS

Mahmoud B. Ahmadian, Application DC-09911 entitled Method and System for Mapping Disk Drivers in a Shared Disk Cluster, 19 pages, Filed Aug. 28, 2006.
Automatic Workload Management with Oracle Real Application Clusters, An Oracle Technical White Paper, http://www.oracle.com/technology/products/database/clustering/pdf/awmrac11g.pdf, 32 pages, 2007.
EMC PowerPath, Information Availability Software, http://www.emc.com/products/software/powerpath/pdf/C737-9_PowerPath_pdg_ldv.pdf, 24 pages, 2005.

* cited by examiner

*Primary Examiner* — Joseph Greene
(74) *Attorney, Agent, or Firm* — Baker Botts L.L.P.

(57) ABSTRACT

An information handling system includes first and second nodes and a storage enclosure. The nodes share access to the storage enclosure. The nodes bind a logical unit number (LUN) in the storage enclosure consistently regardless of an order in which the two devices access the LUN. The system further preferably includes a switch between the nodes and the storage enclosure wherein multiple paths exist between a node and the storage enclosure. The storage enclosure preferably includes first and second storage processors and multiple ports per processor. The first node preferably includes first and second host bus adapters. The first host bus adapter preferably connects the node to a first of the switches and the second host bus adapter connects the node to a second of the switches. The system preferably includes multiple paths between the first node and a LUN in the storage enclosure.

12 Claims, 4 Drawing Sheets

CONSISTENT BINDING OF SHARED STORAGE ACROSS CLUSTERED SERVERS

TECHNICAL FIELD

The present invention is in the field of highly available information handling systems and, more specifically, multi-node information handling systems employing shared storage.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One class of information handling systems is sometimes referred to as a server cluster or, more simply, a cluster. A cluster generally includes two or more cluster nodes that cooperate in some fashion to achieve improved availability, performance, or both. Each cluster node generally has its own processing resources (e.g., its own general purpose microprocessors).

The exemplary embodiments described in the following detailed description emphasize high availability (HA) server clusters. HA server clusters generally include two or more cluster nodes that share access to one or more data storage resources. Data storage resources include, as examples, individual hard disks and/or partitions of individual hard disks and arrays of individual hard disks. A data storage resource may be implemented as networked storage including a storage area network (SAN) or a networked attached storage (NAS) resource.

In many applications including high availability applications, storage resources generally employ arrays of hard disks to achieve redundancy and error correction. RAID (redundant array of inexpensive disks) is a well known family of protocols and technologies that employ disk arrays. The physical disk arrays may be virtually partitioned into "volumes." A logical unit number (LUN) may be assigned to an individual disk or to a virtual partition or volume. The term "LUN" originated in the context of the SCSI (Small Computer System Interface) protocol as a way to differentiate individual disk drives at a common SCSI target, but the term has become commonplace in the field of enterprise storage generally.

In at least some implementations, a cluster node performs an operation referred to as "binding" to create a single device of access from redundant block devices discovered during the connection or association between a node and a LUN or other shared storage resource. Binding may be employed beneficially in applications where multiple physical paths exist between a cluster node and a LUN. When a node binds a shared storage resource, the node creates binding information and associates the binding information with the shared storage resource. The binding information may be referred to herein as a label. In some cases, binding information or labels may resemble UNIX directory paths (e.g., /deviceA).

For a variety of reasons, it is advantageous if binding of shared storage resources is done consistently across the nodes in a cluster. If, for example, Node 1 of a cluster binds a shared storage resource as "Label1," it is desirable that Node 2 binds to the same shared storage resource using the same binding information (i.e., "Label1"). Unfortunately, conventional server cluster implementations do not enforce consistent, inter-node binding of shared storage resources.

SUMMARY OF THE INVENTION

Therefore a need has arisen for an information handling system implementation that encompasses server cluster configurations in which the nodes in the cluster bind to shared storage resources consistently.

The present disclosure describes a system and method for consistently binding shared storage resources in a multi node cluster server.

In one aspect, an information handling system includes first and second nodes of a server cluster and a storage enclosure. The first and second nodes share access to the storage enclosure. The first and second nodes bind a logical unit number (LUN) in the storage enclosure consistently regardless of an order in which the two devices access the LUN. The first and second nodes each preferably includes a central processing unit and a corresponding system memory. The system may include a set of at least one switch between the nodes and the storage enclosure and multiple paths may exist between a node and the storage enclosure. The storage enclosure may include first and second storage processors and multiple ports per storage processor. The first node may include first and second host bus adapters. The first host bus adapter may connect the node to a first of the switches and the second host bus adapter may connect the node to a second of the switches. The system may include multiple paths between the first node and a LUN in the storage enclosure.

In another aspect, a disclosed computer program (software) product includes instructions for binding shared storage in an information handling system, including instructions for determining if any binding label is associated with the storage block responsive to detecting a reference to a storage block, instructions for assigning a binding label to the storage block and binding the storage block using the assigned binding label when no binding label is associated with the storage block, and instructions for reading binding information from the storage block and binding the storage block using information contained in the binding information when a binding label is associated with the block. The method is preferably performed on a first node in a cluster of nodes where the storage block comprises a logical unit number (LUN) in a storage enclosure. The computer program product may include instruction for detecting the universally unique identifiers (UUIDs) of all storage blocks and/or instructions for aborting the binding method if no two of the UUIDs are the same. The computer program product may include instructions for deleting an existing binding name when a binding label associated with the storage block is from a different cluster group.

In yet another aspect, a disclosed method includes binding shared storage in an information handling system, including determining if any binding label is associated with the storage block responsive to detecting a reference to a storage block, assigning a binding label to the storage block and binding the storage block using the assigned binding label when no binding label is associated with the storage block, and reading binding information from the storage block and binding the storage block using information contained in the binding information when a binding label is associated with the block. The method is preferably performed on a first node in a cluster of nodes where the storage block comprises a logical unit number (LUN) in a storage enclosure. The method may include instruction for detecting the universally unique identifiers (UUIDs) of all storage blocks and/or aborting the binding method if no two of the UUIDs are the same. The method may include deleting an existing binding name when a binding label associated with the storage block is from a different cluster group.

The present disclosure includes a number of important technical advantages. One technical advantage is the ability to bind shared storage consistently from node to node in a multi-node environment. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to the drawings wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Preferred embodiments and their advantages are best understood by reference to FIG. 1 through FIG. 4, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
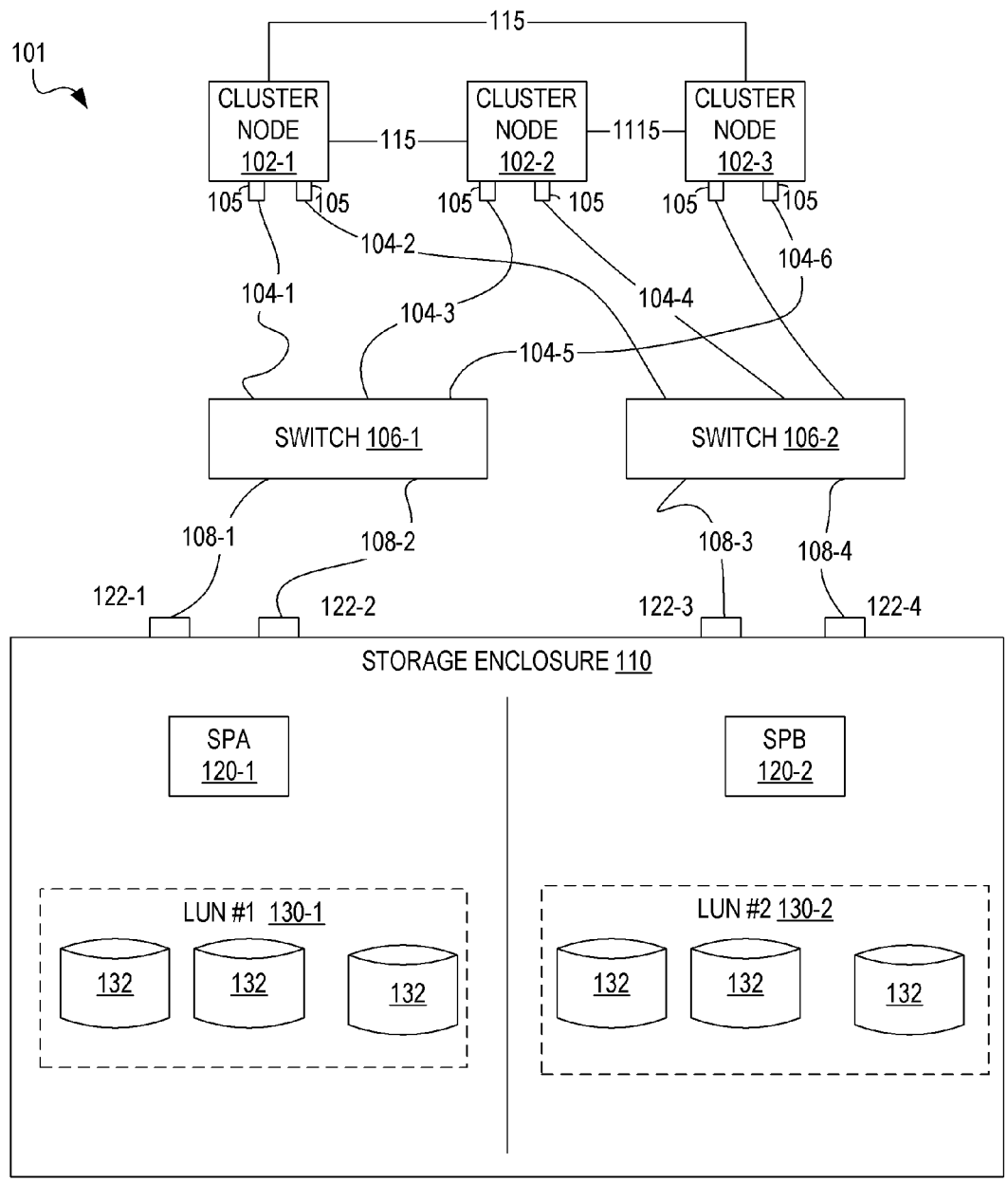
FIG. 1 is a block diagram emphasizing selected elements of an embodiment of a server cluster implementation of an information handling system.

Turning now to the drawings, an embodiment of an information handling system 100 is shown in FIG. 1. The depicted embodiment of information handling system 100 is exemplary of a high-availability server cluster, represented by reference numeral 101. Server cluster 101 as depicted employs redundancy on multiple levels to implement and achieve highly available applications and data.

As depicted in FIG. 1, server cluster 101 includes cluster nodes 102-1, 102-2, and 102-3 (generically or collectively referred to herein as cluster node(s) 102) sharing access to a storage enclosure 110 through a set of switches 106. An interconnect 115 couples cluster nodes 102 to each other and provides a mechanism for communication among cluster nodes 102, for example, to determine when another node is not operating properly. The precise number of nodes is an implementation detail and other implementations may employ more or fewer nodes than the three nodes 102 shown in FIG. 1.

Figure 2:
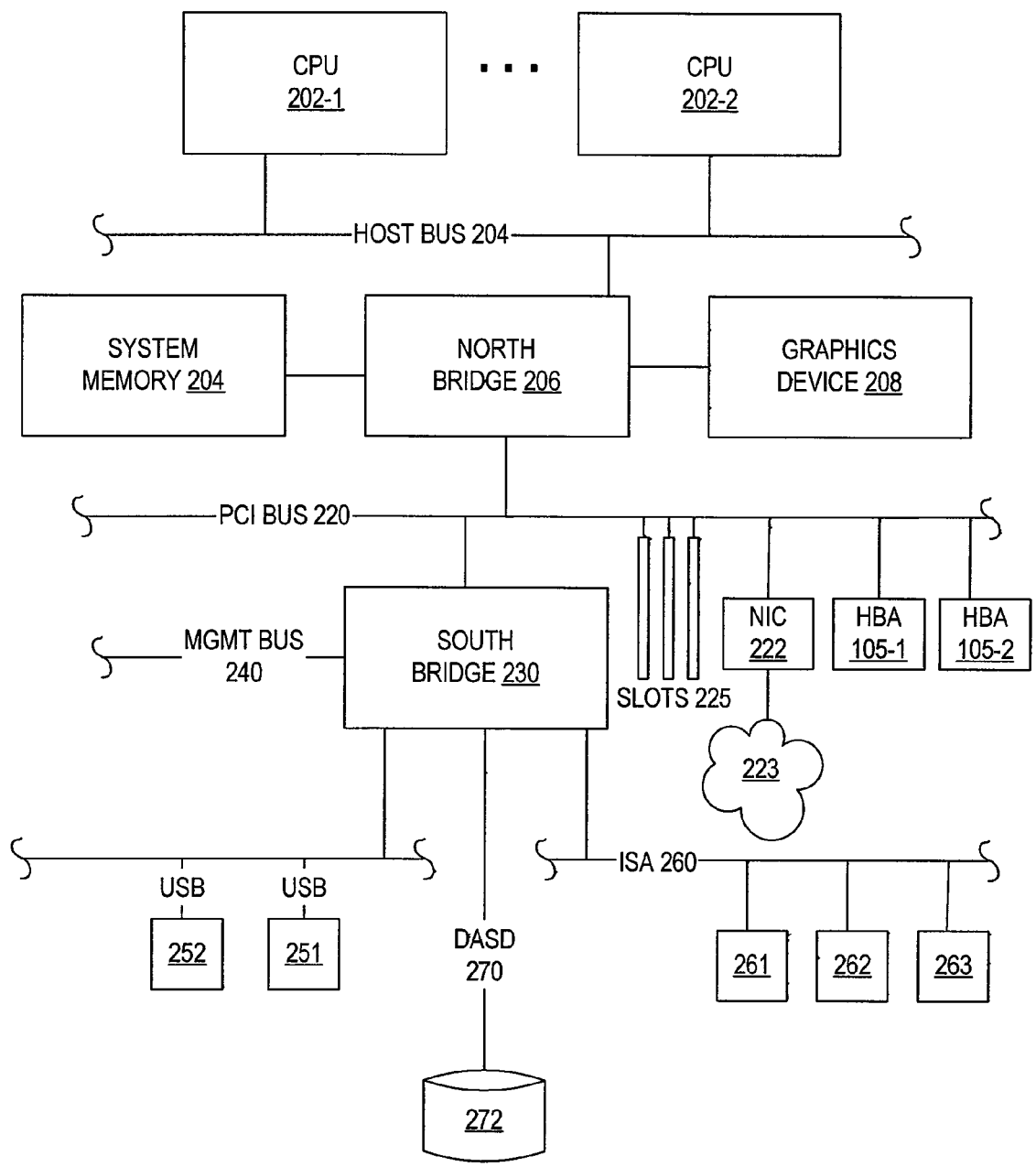
FIG. 2 is a block diagram of selected elements of a node of the server cluster of FIG. 1.

Referring momentarily to FIG. 2, selected elements of an exemplary cluster node 102 are depicted. As depicted in FIG. 2, node 102 includes one or more central processing units (CPUs) 202-1 and 202-2 connected to a shared host bus 204. Each CPU 202 is preferably a general purpose, server class microprocessor such as a Pentium® 4, Xeon®, or Itanium® processor from Intel, an Opteron® processor from Advanced Micro Devices, an UltraSPARC® processor from Sun Microsystems, or the like.

A northbridge chip 206 provides interfaces between host bus 204 and a memory bus 205 coupled to system memory 204 and a graphics bus 207 coupled to a graphics display device 208, and a PCI bus 220. Although, in many implementations, a display device is not needed in or part of a cluster node 102, the device is shown here for the sake of completeness.

A southbridge chip 230 is shown as providing an interface between PCI bus 220 and a legacy bus such as ISA bus 260 and a management bus 240, which is preferably a low pin count bus such as an I2C bus or the like. Peripheral devices attached to ISA bus 260 may include a keyboard/mouse element 261, a system BIOS chip 262, and an optional audio device 263. Southbridge 230 as depicted includes support (i.e., ports) for one or more USB devices 251 and 252.

Although cluster node 102 preferably includes access to shared storage as shown in FIG. 1, a node 102 may optionally include its own direct access storage device (DASD) 272 coupled to southbridge 230 via an serial ATA, SCSI or other suitable DASD interconnection 270. Southbridge chip 230 may also provide support for an optical media drive such as DVD or CD drive (not depicted).

A set of PCI expansion slots 225 are coupled to PCI bus 220 as depicted in FIG. 2. PCI bus 220 may be implemented as two or more PCI busses connected by PCI-to-PCI bridges well known in the field of PCI design. Similarly, PCI bus 220 encompasses any of the family of PCI protocols including PCI (conventional), PCI-X, and PCI-Express, all as described in detail by the PCI Special Interest Group (pcisig.org). A network interface card (NIC) 222 is suitable for connecting cluster node 102 to an external network such as an Ethernet or other form of local area network (LAN) and/or the Internet.

Importantly for purposes of achieving high availability, the depicted embodiment of cluster node 102 includes first and second host bus adapters (HBAs) 105-1 and 105-2 attached to PCI bus 220. The pair of HBAs 105 may include a pair of single port HBAs or a single, dual port HBA. Exemplary HBAs 105 may replicate features of the QLogic QLE2462 HBA (dual port) and/or the QLogic QLE2460 HBA (single port) distributed by Dell Inc. HBAs 105 preferably support full duplex data rates exceeding 750 MB/s per port and at least 4 GB/s Fibre Channel data rate in a PCI Express adapter. Dual HBA ports provide port redundancy useful in the event of a port failure.

Returning now to FIG. 1, some embodiments of storage enclosure 110 are exemplified by a Dell/EMC AX150 Network Storage System. In such embodiments, storage enclosure 110 includes two active/active storage processors, SPA 120-1 and SPB 120-2, and as many as twelve 250 GB or 500 GB SATA-II disk drives 132. Storage enclosure 110 preferably includes redundant fans, and fully redundant "N+1" power supplies in a 3U chassis that includes a 1U, UPS (universal power supply) to increase data availability.

The depicted embodiment of storage enclosure 110 includes four host ports 122-1 through 122-4. Switches 106-1 through 106-2 enable a plurality of cluster nodes 102, each having a pair of host bus adapters (HBAs) 105 to connect to storage enclosure 110 in a high availability configuration in which dual and independent paths exist from each cluster node 102 to storage enclosure 110.

In the depicted implementation, for example, cluster node 102-1 may access storage enclosure 110 via interconnect 104-1, switch 106-1, and interconnection 108-1 or via interconnection 104-2 and switch 106-2 and interconnection 108-2. Using switches 106, exemplified in some embodiments by the Brocade SW200E Fibre Channel switch, storage enclosure 110 can host storage for up to 10 redundantly or non-redundantly connected nodes 102. Storage enclosure 110 includes four host ports 122-1 through 122-4.

Some embodiments of a consistent binding method disclosed herein include or are implemented as sequence or collection of CPU executable instructions (code) stored on or embedded in a computer readable storage medium. The computer readable storage medium may be a persistent storage medium such as a magnetic disk, optical disk, or the like or a volatile storage medium such as a system memory (DRAM) or cache memory (SRAM).

Figure 3:
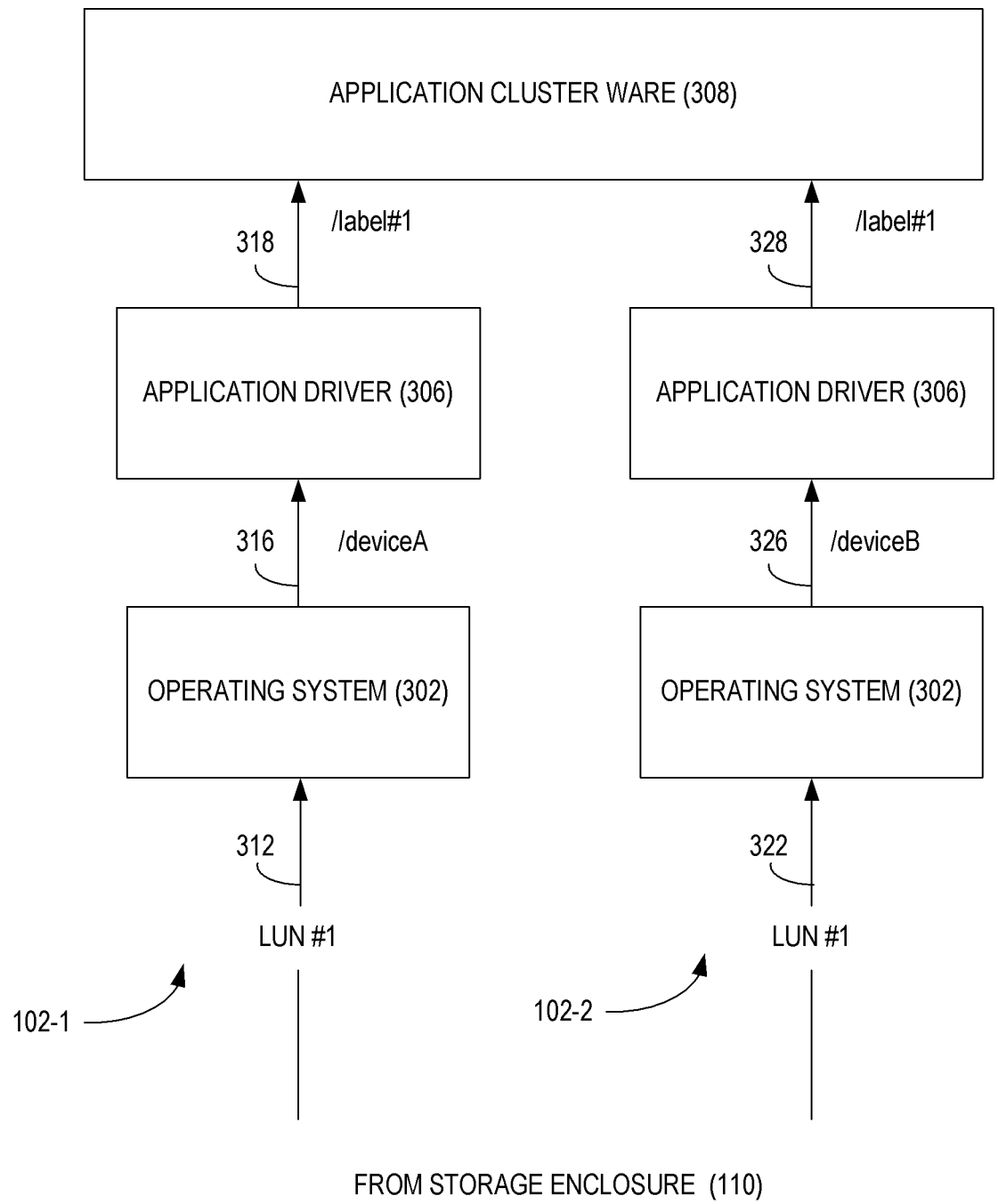
FIG. 3 is a conceptual representation of a software/firmware implementation suitable for use in achieving consistent binding of shared.

Referring now to FIG. 3, a conceptual depiction of selected software elements of one embodiment of cluster server 101 are shown. FIG. 3 illustrates a layering of software object including, from bottom to top, operating system code 302, instances of which are shown for each of two cluster nodes, application driver code 306 instances of which are shown on two cluster nodes, and application code referred to as cluster ware 308, which spans both nodes. FIG. 3 also illustrates that how storage resources are referred to may change in each successive layer of the software.

FIG. 3 emphasizes consistent binding to shared storage resources across disparate nodes in a server cluster. The sequence of arrows and labels illustrated on the left side of FIG. 3 is representative of binding that may occur when a first cluster node binds a storage resource while the sequence of arrows and labels illustrated on the right side is representative of the binding that may occur when a second cluster node binds to the same storage resource. Importantly and beneficially, FIG. 3 illustrates that, while different instances of operating system code 302 executing on different cluster nodes may produce different references for the same storage resource, an application driver 306 executing on each cluster node assigns common labels to common storage resources.

Incorporating application driver 306 into its software structure enables each cluster node to produce the same label for the same storage structure. When this information is viewed by a human administrator or passed to a hypervisor or other piece of cluster code such as the application cluster ware represented in block 308, the commonality of storage references across nodes has the potential to greatly simplify management, analysis, and maintenance of cluster 101.

In FIG. 3, first cluster node 102-1 receives a reference, represented by reference numeral 312, to a LUN (LUN#1) within storage enclosure 110. The reference may be made as part of either a write to storage enclosure 110 or a read from storage enclosure 110. Operating system 302 of first node 102-1 as depicted in the example of FIG. 3, generates an identifier for LUN#1. In the depicted example, operating system 302 generates the identifier for LUN#1 as a directory path /deviceA. Operating system 302 may include one or more layers of code not explicitly depicted in FIG. 3. Operating system 302 may include, for example, device drivers, kernel code, and other code for receiving and processing information from storage enclosure 110. Each of these layers may generate its own reference for LUN#1.

Regardless of how operating system 302 is implemented, it eventually generates reference 316 (e.g., /deviceA) to refer to LUN#1. Operating system 302 passes reference 316 to application driver 306. Application driver 306 generates another reference 318, also referred to herein as label 318, referring to LUN#1. In the depicted example, the label is /label#1. Application driver 306 ensures that label 318 generated by host 102-1 referring to LUN#1 is the same as a label 328 generated by host 102-2 produced when cluster node 102-2 receives a reference 326 to LUN#1, even when a reference 326 to LUN#1 generated by operating system 302 of host 102-2 (e.g., /deviceB) differs from reference 316 (/deviceA). Application drivers 306 pass the common label (/label#1) onto application cluster ware 308, which may include code for managing the cluster 100 as a whole.

In one embodiment, application driver 306 forces consistent binding to a storage device among the nodes by determining whether the storage device has been bound previously by another node. If the storage device has not been bound previously, application driver 306 determines the label and writes the label to the storage device. Thereafter, the application driver 306 operating on any node receiving a reference to the storage device will perform the same check to determine if another node has previously bound the device. If the storage device has been bound, application driver reads the binding information, including the binding label, from the storage device and binds the storage device using the binding label.

Some embodiments of the invention may be implemented as computer executable instructions stored on or embedded in a computer readable medium. When executed by a CPU or other suitable processor, the instructions cause the CPU to perform a method that ensures consistent binding to a shared storage resource across multiple nodes in a server cluster. The computer readable storage medium may be a persistent storage medium such as a hard disk, an optical disk (CD or DVD), a flash memory or other ROM device, a magnetic tape, or the like. The computer readable medium may also be a volatile storage device such as a system memory or cache memory of a cluster node 102.

Figure 4:
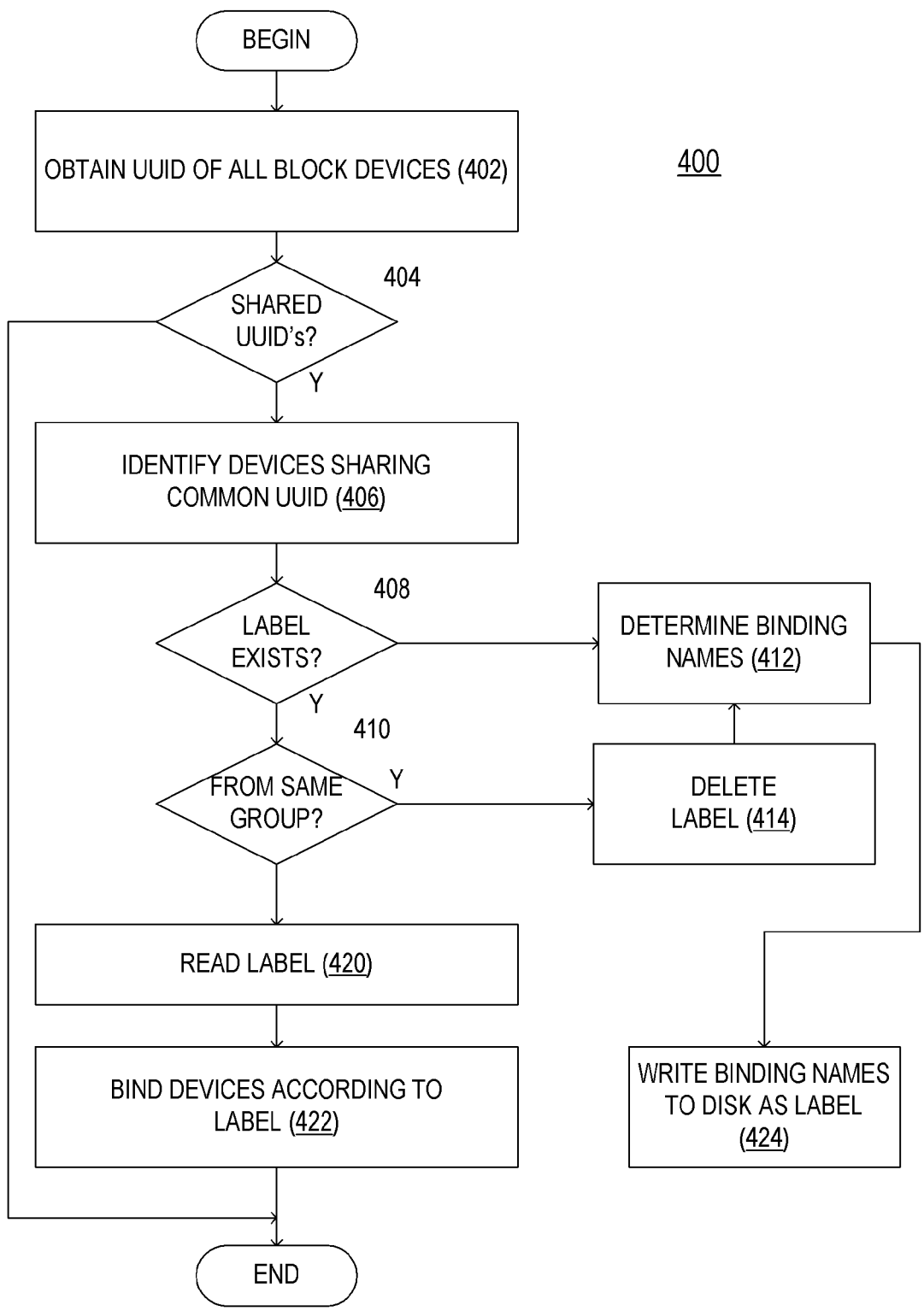
FIG. 4 is a flow diagram depicting an embodiment of a method of consistent inter-node binding in a server cluster configuration.

Referring now to FIG. 4, a flow diagram illustrates one implementation of a method 400 for consistently binding a storage device by each of a plurality of cluster nodes in a cluster server. Method 400 represents an embodiment of application driver 306.

In the depicted embodiment of method 400, application driver 306 obtains (402) the universally unique identification (UUID) of all storage devices or LUNs to which the node has access. As suggested by its name, the UUID of a storage device or LUN is different for each storage device. Application driver 306 then determines (404) from the list of UUIDs obtained in step 402 whether there are any UUIDs that are shared. If there are no shared UUIDs, application driver 306 as depicted in FIG. 4 terminates without binding the storage device or LUN.

Terminating the binding process when there are no duplicate UUIDs may be suitable or preferable in server cluster configurations that exhibit a particular symmetry on each node. As an example, some implementations of cluster servers implement each node consistently such that, if the first node does not include multiple paths to a storage device or LUN, then second and subsequent nodes will not include multiple paths to the storage device either. Similarly, if the first node includes multiple paths to a storage device, thereby necessitating the need for a binding label, then second and subsequent nodes preferably also include multiple paths to the node. Referring back to FIG. 1, for example, the node 102-1 includes two paths to LUN#1 130-1, namely, a first path via interconnection 104-1 and switch 106-1 and a second path via interconnection 104-2 and switch 106-2. Similarly, node 102-2 also includes two paths to LUN#1 130-1, namely, a first path via interconnection 104-3 and switch 106-1 and a second path via interconnection 104-1 and switch 106-2.

When this type of architectural symmetry is known to exist on the server cluster, then application driver 306 may opt to terminate when it determines that a node does not include multiple paths to any storage device. In other implementations, however, method 400 may omit the determination made in step 404 when architecturally symmetry is not assumed and label devices even if there is only a single path to the device from one of the cluster nodes 102.

Referring back to FIG. 4, method 400 includes identifying (406) all of the storage devices that share a UUID after determining that there is at least one shared UUID. For each storage device identified as sharing a UUID, method 400 determines (408) whether a binding label already exists. If a label does not exist, method 400 includes assigning (412) binding information to the device. If, on the other hand, a label does exist, method 400 includes determining (block 410) whether the label was assigned by a cluster node belonging to the same cluster group as the cluster group that assigned the existing label. If a label does exist, but the existing label originated with a different cluster group, method 400 includes deleting (block 414) the existing label and assigning a (new) label in step 412.

When method 400 assigns a binding name to a storage device it then writes (424) the assigned name to the storage device as a label. Method 400 may then terminate as shown in FIG. 4. Conceptually, method 400 may be said to assign a binding label to a storage device only when a binding label has not been previously assigned to the storage device by a node from the same cluster group. For example, the first node in a cluster that references a particular storage device will assign the storage device a label, bind the storage device using the label, and write the binding information to the storage device where the binding information may be discovered or read by any other storage device that receives a reference to the same storage device.

If method 400 determines in step 408 that a binding label exists for a storage device and that the existing binding label was assigned by a node from the same cluster group, method 400 includes reading (420) the existing label from the storage device and binding (422) the label using or otherwise according to the label that was read from the device. In this manner, any cluster node that receives a reference to a storage device that was previously bound by another node, will bind the storage device using the same binding label as the label assigned by the first node.

In this manner, cluster nodes that receive references from a storage device will determine a binding name if no other binding name was previously assigned, but, otherwise, will bind a storage device using a binding label that was assigned by another node, namely, the first node that accessed the storage device. Using method 400 results in all nodes in a cluster group using the same binding information for a particular storage device, thereby achieving consistent binding to shared storage across disparate nodes in a server cluster information handling system.

Although the disclosed embodiments have been described in detail, it should be understood that various changes, substitutions and alterations can be made to the embodiments without departing from their spirit and scope.

What is claimed is:

1. A method of binding shared storage in an information handling system, comprising:
   obtaining, by a first node, unique identifiers for each of a plurality of storage devices in the information handling system;
   determining, by the first node, if one or more of the unique identifiers is shared among two or more of the plurality of storage devices;
   in response to determining that one or more of the unique identifiers is shared among two or more of the plurality of storage devices, determining, by the first node, for each storage device having a shared unique identifier, whether a particular storage device is bound with a second node by an existing binding label;
   in response to determining that the particular storage device is not bound by the existing binding label, automatically assigning, by the first node, a new binding label to the particular storage device; and
   in response to determining that the particular storage device is bound by the existing binding label, binding, by the first node, the particular storage device using the existing binding label.

2. A method according to claim 1, wherein the unique identifiers are each universally unique identifiers (UUIDs) of the storage devices.

3. A method according to claim 1, wherein the storage device comprises a logical unit number (LUN) in a storage enclosure.

4. A method according to claim 1, further comprising deleting, by the information handling system, the existing binding label when the existing binding label associated with the particular storage device is from a different cluster group.

5. A computer program product comprising instructions stored on a computer readable storage device for binding shared storage in an information handling system, the instructions comprising:

> instructions for obtaining unique identifiers for each of a plurality of storage devices in an information handling system;
>
> instructions for determining if one or more of the unique identifiers is shared among two or more of the plurality of storage devices;
>
> instructions for in response to determining that one or more of the unique identifiers is shared among two or more of the plurality of storage devices, determining, for each storage device having a shared unique identifier, whether a particular storage device is bound with a first node by an existing binding label;
>
> instructions for in response to determining that the particular storage device is not bound by the existing binding label, automatically assigning a new binding label to the particular storage device; and
>
> instructions for in response to determining that the particular storage device is bound by the existing binding label, binding the particular storage device to a second node using the existing binding label.

6. A computer program product according to claim 5, wherein the unique identifiers are each universally unique identifiers (UUIDs) of the storage devices.

7. A computer program product according to claim 5, wherein the storage device comprises a logical unit number (LUN) in a storage enclosure.

8. A computer program product according to claim 5, further comprising instructions for deleting the existing binding label when the existing binding label associated with the particular storage device is from a different cluster group.

9. An information handling system, comprising:

> a server cluster having a first node and a second node; and
> a storage enclosure shared by the first and second nodes, the storage enclosure having a plurality of storage devices;
> wherein the server cluster is configured to:
>> obtain unique identifiers for each of the plurality of storage devices;
>> determine if one or more of the unique identifiers is shared among two or more of the plurality of storage devices;
>> in response to determining that one or more of the unique identifiers is shared among two or more of the plurality of storage devices, determine, for each storage device having a shared unique identifier, whether a particular storage device is bound with the first node by an existing binding label;
>> in response to determining that the particular storage device is not bound by the existing binding label, automatically assign a new a binding label to the particular storage device; and
>> in response to determining that such particular storage device is bound by the existing binding label, bind the particular storage device to the second node using the existing binding label.

10. An information handling system according to claim 9, wherein the unique identifiers are each universally unique identifiers (UUIDs) of the storage devices.

11. An information handling system according to claim 9, wherein the storage device comprises a logical unit number (LUN) in a storage enclosure.

12. An information handling system according to claim 9, the server cluster further configured to delete the existing binding label when the existing binding label associated with the particular storage device is from a different cluster group.

* * * * *